Sept. 16, 1952 J. E. CHAPMAN 2,610,718
MECHANICAL CLUTCH
Filed Nov. 29, 1946
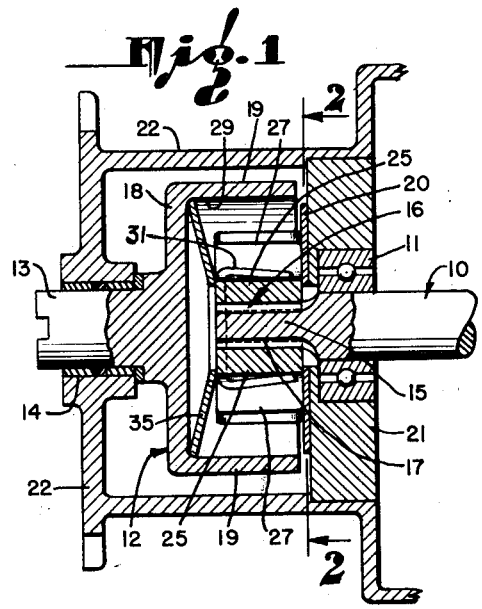
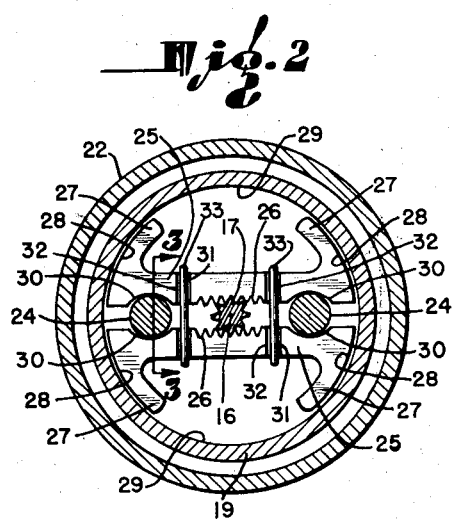
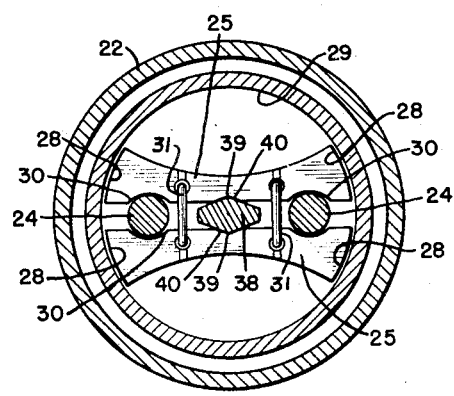
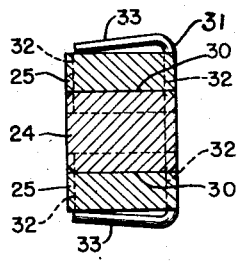
INVENTOR.
JAMES E. CHAPMAN
BY
ATTORNEY Patented Sept. 16, 1952

2,610,718

UNITED STATES PATENT OFFICE 2,610,718

MECHANICAL CLUTCH

James E. Chapman, Los Angeles, Calif., assignor to The Garrett Corporation, Los Angeles, Calif., a corporation of California Application November 29, 1946, Serial No. 712,947

12 Claims. (Cl. 192—76)

My invention relates to a clutch or drive connection operative between a driving member and a driven member so that rotation of the driving member will positively drive the driven member, this drive connection having the characteristic of automatically releasing when rotation of the driving member is stopped, so that the driven member may then be turned independently of the driving member.

Although this automatically releasing drive connection has utility with many mechanisms, it is of especial usefulness as a drive connection between the motor driven driving mechanism and the moving power output member of actuators such as employed in aircraft to move various parts of the aircraft structure, such, for example, as flaps, doors, undercarriage, etc. The invention provides a simple means for enabling manual operation of these actuators at any time.

It is an object of the invention to provide a self-releasing two-way drive connection having therein clutch elements which are maintained in retracted inoperative condition when the driving member or drive shaft is stationary, and having a simple means of cam character for actuating the clutch members into operative position, in response to rotation of the drive shaft.

It is a further object of the invention to provide a self-releasing drive connection of the character described in the preceding paragraph, wherein the cam means for actuating the clutch members comprises a spur gear which projects from or forms part of the driving member and engages cooperating teeth formed on the clutch members, these teeth forming toothed racks which are engaged by the teeth of the gear so that when the gear is rotated, force is transmitted therefrom through the teeth of the rack to the clutch members to move the same outwardly into engagement with a wall or friction surface of the driven member.

A further object of the invention is to provide a self-releasing drive connection of this type having simple means for retracting the clutch members when the rotation of the driving member is discontinued, so that the clutch members will then lie in centralized relation to the axis of rotation of the driving and driven members, to enable independent rotation of the driven member.

Further objects and advantages of the invention will be brought out in the following part of the specification.

Referring to the drawing which is for illustrative purposes only,

Fig. 1 is a longitudinal sectional view through a preferred embodiment of my invention.

Fig. 2 is a sectional view taken as indicated by the line 2—2 of Fig. 1.

Fig. 3 is a fragmentary sectional view taken as indicated by the line 3—3 of Fig. 2.

Fig. 4 is a sectional view of an alternate form of my invention taken from the same viewpoint as Fig. 2.

In Fig. 1 I show a driving member 10 supported for rotation by bearing means 11 mounted in end plate 21. This driving member 10 is shown as a shaft which may be, for example, the output shaft of a motor driven reduction gear mechanism of a slow speed actuator, not shown. Axially aligned with the shaft 10 there is a driven member 12 having a shaft 13 supported for rotation by bearing means 14 mounted in a cup-shaped housing 22.

On the end 15 of the shaft 10, which projects toward the driven member 12, clutch actuating means 16 is provided, this clutch actuating means 16 comprising a spur gear having gear teeth 17 formed on the shaft 10. The driven member 12 has a radial wall 18 which is spaced from the gear 16, and a cylindric wall 19 which projects from the periphery of the radial wall 18 so as to surround the gear 16 in concentric relation thereto. Attached to the end plate 21 is a flat annular static member 20.

Within the cylindric wall 19 of the driven member 12 are arranged clutch shoes 25 which are positioned on opposite sides of the gear 16 and have on the inner faces thereof rack teeth 26 which engage the gear teeth 17. The ends of the clutch members or shoes 25 comprise arcuate walls 27 having outer curved surfaces 28 formed for frictional engagement with the inner surface 29 of the cylindric wall 19. When the shoes 25 are in centralized position as shown in Fig. 2, the curved surfaces 28 thereof define a cylinder of slightly smaller diameter than the cylindric inner surface 29 of the wall 19. Therefore, when the shoes 25 are in said centralized position, the surfaces 28 of the shoes 25 will not pressurally engage the wall 19.

On the inner faces of the clutch shoes 25 between the rack teeth 26 and the ends of the shoes are cylindrical grooves 30 in which are seated rollers 24 of slightly less radius than the grooves 30. A pair of rollers 24 are employed, one on each side of the gear 16. C-shaped springs 31 are applied to the clutch shoes 25 so as to force them toward each other, and toward engagement with the rollers 24, so that the rollers 24 thus support the shoes 25 in parallelism, yet permit them to shift a limited distance relative to each other. The sides of the shoes 25 have grooves 32 therein to receive the substantially straight portions of the springs 31 and the hooked end portions 33 of the springs 31 are positioned so as to engage the outer faces of the shoes 25 as shown in Fig. 3. A dished spring washer 35 is positioned between the radial wall 18 of the driven member 12 and the adjacent faces of the clutch shoes 25, as shown in Fig. 1, and holds the shoes 25 against the fixed static member 20.

The operation of the self-releasing two-way driven connection is as follows: When the driving member 10 is stationary, the spring members 31 cause the clutch shoes 25, through engagement with the rollers 24, to assume a substantially centralized position in relation to the axis of the driving and driven members 10 and 12, at which time there is a minimum practical running clearance between the friction surfaces 28 of the shoes 25 and the inner cylindric surface 29 of the wall 19. When power is applied through the driving member 10, that is to say—when the driving member 10 is rotated—the friction between the static member 20 and the clutch shoes 25 which are held in contact with each other by the dished spring washer 35, cause the clutch shoes 25 to resist rotation and thus be oppositely and outwardly shifted by the action of gear teeth 17 on rack teeth 26 until they engage the friction surface 29 of the cylindric wall 19. In addition to the thrust of the gear 16, the clutch shoes 25 tend to be wedged outwardly by the action of the rollers 24 riding up on the sides of the grooves 30. The clutch shoes 25 also tend to be thrown outwardly by centrifugal force, but the effect of the centrifugal force is comparatively small and incidental and is unnecessary to the operation of the clutch.

In Fig. 4 I have illustrated an alternate form of my invention in which the clutch actuating means comprises a cam 38 formed on the shaft 10 and a notch 39 on the inner face of each clutch shoe 25.

When the driving member 10 is stationary, the cam 38 rests freely in the apex of the notch 39, thereby permitting the spring 31 to remove the clutch members from driving engagement with the surface 29, and to hold the clutch shoes in a substantially centralized position in relation to the axis of the driving and driven members through engagement with the rollers 24. When the driving member 10 is rotated the cam member 38 engages the sides 40 of the notch 39 and forces the clutch shoes 25 into driving engagement with surface 29.

It will be recognized that the movement of the shoes 25 is very small in view of the small clearance between the surfaces 28 thereof and the surface 29 of the cylindric wall 19, when the shoes are in centralized position, and therefore the clutch will take hold rapidly and at low rotational speed. Also, the clutch shoes are disengaged substantially instantaneously under the action of the springs 31 whenever the shaft 10 is brought to a stop, and thereafter the driven member 12 may be manually rotated at will. Another valuable feature of the invention is that the drive mechanism will operate in either direction of rotation, due to the symmetry of the shoes 25 and the provision of similar frictional engagement surfaces 28 at both ends thereof.

I claim as my invention:

1. In a releasing two-way drive connection, the combination of: a rotatable driving member having a projecting spur gear element disposed on its axis of rotation and connected for rotation therewith; a driven member axially aligned with said driving member, having an annular wall surrounding said gear element; clutch members disposed within said annular wall and on opposite sides of said gear element, each of said clutch members having teeth to engage said gear element so that rotation of said gear element will transmit through said teeth to said clutch members a force to move said clutch members into driving engagement with said annular wall; and yieldable means for forcing the teeth of said clutch members toward said gear element and removing said clutch members from driving engagement with said annular wall when rotation of said gear element is stopped.

2. In a releasing two-way drive connection, the combination of: a rotatable driving member having a projecting spur gear element disposed on its axis of rotation and connected for rotation therewith; a driven member axially aligned with said driving member, having an annular wall surrounding said gear element; clutch members disposed within said annular wall and on opposite sides of said gear element, each of said clutch members having teeth to engage said gear element so that opposite directions of rotation of said gear element will respectively transmit through said teeth to said clutch members a force to move said clutch members into driving engagement with said annular wall; spring means for forcing the teeth of said clutch members toward said gear element and removing said clutch members from driving engagement with said annular wall when rotation of said gear element is stopped; and centralizing means cooperating with said spring means to maintain said clutch members in centralized relation to said annular wall when said driving member is not rotating.

3. In a releasing two-way drive connection, the combination of: a rotatable driving member having a projecting spur gear element disposed on its axis of rotation and connected for rotation therewith; a driven member axially aligned with said driving member, having an annular wall surrounding said gear element; double ended clutch members disposed within said annular wall and on opposite sides of said gear element, each of said clutch members having teeth to engage said gear element so that opposite directions of rotation of said gear element will respectively transmit through said teeth to said clutch members a force to move said clutch members into driving engagement with said annular wall; spring means for forcing said clutch members from driving engagement with said annular wall when rotation of said gear element is stopped; and guide means between said clutch members for bringing them into centralized relation to said annular wall when said clutch members are forced together by said spring means.

4. In a releasing reversible drive connection, the combination of: a rotatable driving member having a projecting cam member disposed on its axis of rotation; a driven member axially aligned with said driving member, having an annular wall provided with a friction surface surrounding said cam member; elongate clutch members supported within said annular wall on opposite sides of said cam member for relative shifting movements, said cam member being engaged by said clutch members and so formed that rotation of said cam member in opposite directions will respectively transmit to said clutch members a force to move said clutch members into frictional engagement with said friction surface; friction means to resist rotation of said clutch members; spring means for forcing said clutch members toward said cam member and removing said clutch members from frictional engagement with said friction surface when rotation of said cam member is stopped; and centralizing means positioned between the clutch members and engaged thereby for cooperating with said spring means to maintain said clutch members in centralized relation to said annular wall when said driving member is not rotating.

5. In a releasing reversible drive connection, the combination of: a rotatable driving member having a projecting cam member disposed on its axis of rotation; a driven member axially aligned with said driving member, having an annular wall provided with a friction surface surrounding said cam member; elongate clutch members supported within said annular wall on opposite sides of said cam member for relative shifting movements, said cam member being engaged by said clutch members and so formed that rotation of said cam member in opposite directions will respectively transmit to said clutch members a force to move said clutch members into frictional engagement with said friction surface; means normally resisting rotation of said clutch members; spring means for forcing said clutch members toward said cam member and removing said clutch members from frictional engagement with said friction surface when rotation of said cam member is stopped; and guide means including parts on said cam having interfitting engagement with said clutch members for bringing them into centralized relation to said annular wall when said clutch members are forced together by said spring means.

6. In a releasing two-way drive connection, the combination of: a rotatable driving member having a projecting cam member disposed on its axis of rotation; a driven member axially aligned with said driving member, having an annular wall surrounding said cam member; clutch members disposed within said annular wall and on opposite sides of said cam member, each of said clutch members engaging said cam member so that rotation of said cam member will transmit to said clutch members a force to move said clutch members into driving engagement with said annular wall; rollers between said clutch members upon which they are relatively movable; friction means to resist rotation of said clutch members with said driving member; and spring means for forcing said clutch members toward said cam member and removing said clutch members from driving engagement with said annular wall when rotation of said cam member is stopped.

7. In a releasing two-way drive connection, the combination of: a rotatable driving member having a projecting cam member disposed on its axis of rotation; a driven member axially aligned with said driving member, having an annular wall surrounding said cam member; clutch members disposed within said annular wall and on opposite sides of said cam member, each of said clutch members engaging said cam member so that rotation of said cam member will transmit to said clutch member a force to move said clutch members into driving engagement with said annular wall; friction means abutting one side of said clutch members to resist rotation of said clutch members; a spring member between said driven member and the opposite side of said clutch members for providing frictional contact between said friction means and said clutch members; spring means for forcing said clutch members toward said cam member and removing said clutch members from driving engagement with said annular wall when rotation of said cam member is stopped; and guide members disposed between said clutch members, said guide members having guide engagement with said clutch members to bring said clutch members into centralized relation to the axis of said driving member when said clutch members are forced toward each other by said spring means.

8. In a releasing two-way drive connection, the combination of: a rotatable driving member having a projecting cam member disposed on its axis of rotation; a driven member axially aligned with said driving member, having an annular wall surrounding said cam member; clutch members disposed within said annular wall and on opposite sides of said cam member, each of said clutch members engaging said cam member so that rotation of said cam member will transmit to said clutch members a force to move said clutch members into driving engagement with said annular wall; friction means to resist rotation of said clutch members; means for providing frictional contact between said friction means and said clutch members; spring means for forcing said clutch members toward said cam member and removing said clutch members from driving engagement with said annular wall when rotation of said cam member is stopped; and roller members having guide engagement with said clutch members for bringing said clutch members into centralized relation to the axis of said driving member when said clutch members are forced toward each other by said spring means.

9. In a releasing reversible drive connection, the combination of: a rotatable driving member; a driven member axially aligned with said driving member having an annular wall surrounding the driving member; elongate clutch members disposed within said annular wall and on opposite sides of said driving member; means positioned between the clutch members operative in response to rotation of the driving member to move the clutch members into driving engagement with said annular wall to form with said means a driving connection between the driving and driven members; friction means to resist rotation of said clutch member; spring means biasing said clutch members from driving engagement with said annular wall when rotation of the driving member ceases; and guide means between said clutch members including parts on opposite sides of said first means engageable by each of said clutch members, adapted to bring them into centralized relation to said annular wall when said clutch members are moved from driving engagement by the spring means.

10. In a releasing two-way drive connection, the combination of: a rotatable driving member; a driven member axially aligned with said driving member and having an annular wall surrounding the driving member; clutch members disposed within said annular wall and on opposite sides of said driving member; means positioned between the clutch members operative in response to rotation of the driving member to relatively move the clutch members in opposite directions into driving engagement at their opposite ends with said annular wall to form with said means a driving connection between said driving and driven members; friction means to resist rotation of said clutch members with said driving member; and spring means biasing said clutch members from driving engagement with said annular wall when rotation of the driving member ceases.

11. In a releasing reversible drive connection, the combination of: a rotatable driving member; a driven member axially aligned with said driving member and having an annular wall surrounding the driving member; elongate clutch members disposed within said annular wall and on opposite sides of said driving member; each of said clutch members having surfaces at its opposite ends for engaging said annular wall; means positioned between the clutch members, including a part operative in response to rotation of the driving member to relatively move the clutch members longitudinally, for moving the clutch members into driving engagement at their opposite ends with said annular wall to form with said means a driving connection between said driving and driven members; friction means to resist rotation of said clutch members; and spring means connecting said clutch members between their ends for moving them from driving engagement with said annular wall when rotation of the driving member ceases.

12. In a releasing two-way drive connection, the combination of: a rotatable driving member; a driven member axially aligned with said driving member and having an annular wall surrounding the driving member; clutch members disposed within said annular wall having confronting inner faces disposed on opposite sides of said driving member; confronting grooves in said faces positioned on opposite sides of said driving member; spacing rollers seated in said grooves; means positioned between the clutch members and between said rollers interconnecting the clutch members with the driving member for relatively shifting said clutch members in opposite directions into driving engagement with said annular wall in response to rotation of the driving member, whereby a driving connection is established between the driving and driven members; means for resisting rotation of the clutch members and spacing rollers with said driving member; and means resiliently urging said clutch members toward positions wherein the rollers are respectively seated in the associated of said grooves.

JAMES E. CHAPMAN.

REFERENCES CITED

The following references are of record in the file of this patent:

UNITED STATES PATENTS

| Number | Name | Date |
| --- | --- | --- |
| 253,083 | Merritt | Jan. 31, 1882 |
| 1,110,802 | Ledeboer | Sept. 15, 1914 |
| 1,610,794 | Keller | Dec. 14, 1926 |
| 1,806,340 | Francis | May 19, 1931 |
| 2,373,462 | Crow | Apr. 10, 1945 |

FOREIGN PATENTS

| Number | Country | Date |
| --- | --- | --- |
| 342,446 | Austria | Dec. 4, 1929 |